United States Patent [19]

Sayles

[11] Patent Number: 5,209,876
[45] Date of Patent: May 11, 1993

[54] CLOTH-LINED INTERCEPTOR MOTOR INSULATION FOR STRONG INSULATION-TO-PROPELLANT INTERLOCK

[75] Inventor: David C. Sayles, Huntsville, Ala.

[73] Assignee: The United States of America as represented by the Secretary of the Army, Washington, D.C.

[21] Appl. No.: 944,596

[22] Filed: Sep. 14, 1992

[51] Int. Cl.$^5$ .............................. C06B 21/00
[52] U.S. Cl. ....................... 264/3.3; 264/3.4; 86/20.12; 102/289; 102/290
[58] Field of Search ............ 264/3.3, 3.4; 86/20.12; 102/289, 290

[56] References Cited

U.S. PATENT DOCUMENTS

| | | | |
|---|---|---|---|
| 3,212,256 | 10/1961 | Sampson | 60/35.6 |
| 3,507,114 | 4/1970 | Webb | 60/39.47 |
| 3,541,195 | 11/1970 | Anderson et al. | 264/94 |
| 3,570,364 | 3/1971 | Thibodaux, Jr. | 86/1 |
| 3,716,604 | 2/1973 | Dehm | 264/3 R |
| 3,813,308 | 5/1974 | Skidmore | 149/109 |
| 4,042,441 | 8/1977 | Wasserman et al. | 156/306 |
| 4,085,173 | 4/1978 | Lomax, Jr. et al. | 264/3 R |
| 4,328,281 | 5/1982 | Wrightson | 428/423.1 |
| 4,337,218 | 6/1982 | Byrd et al. | 264/3 R |
| 4,604,248 | 5/1986 | Dehm | 264/3.1 |
| 4,649,823 | 3/1987 | Bell | 102/289 |
| 4,840,025 | 6/1982 | Coffinberry | 102/289 X |
| 4,870,884 | 10/1989 | Schubart et al. | 86/20.12 |
| 5,007,343 | 4/1991 | Marks | 102/291 X |
| 5,085,725 | 2/1992 | Sayles | 156/281 |

Primary Examiner—Peter A. Nelson
Attorney, Agent, or Firm—Hugh P. Nicholson; Freddie M. Bush

[57] ABSTRACT

A method of providing a very strong mechanical interlock between the insulator and propellant of an interceptor rocket motor by employing a first lay-up material comprised of a cloth mat of woven cotton cloth (muslin) over a release liner with bleeder which covers a mandrel shell with a boss and a second lay-up material of an uncured vulcanizable rubber insulator, e.g., ethylene-propylene-diene-monomer (EPDM) with additives and curatives. The lay-up materials are subjected to a vacuum bag and autoclave curing environment to complete a vulcanization cycle to vulcanize and consolidate the insulator to the cloth mat. The vulcanized insulator/cloth mat is installed in a rocket motor case. The muslin cloth mat has many protruding microfibers which will be in the interface section when an uncured propellant composition is cast onto and cured to the vulcanized insulator/cloth mat. A very strong mechanical interlock is achieved which exceeds breaking strength of propellant and insulator. Tensile adhesion strength, shear composite adhesion strength, and peel strength are higher for cloth mat faced or fabric faced insulator on propellant-to-insulator bonding as compared with insulator-propellant bonding without cloth mat facing.

4 Claims, 5 Drawing Sheets

CLOTH-LINED INTERCEPTOR MOTOR INSULATION FOR STRONG INSULATION-TO-PROPELLANT INTERLOCK

DEDICATORY CLAUSE

The invention described herein may be manufactured, used, and licensed by or for the Government for governmental purposes without the payment to me of any royalties thereon.

BACKGROUND OF THE INVENTION

The liner of a missile motor consists of a thin layer of a polymerizable material which serves as a bond between the propellant and insulation. It is most generally formulated to be similar to the binder of the propellant. The liner has proven necessary because the insulations, in use in rocket motors, have produced too weak a bond to the propellant, and if a separation were to take place between the propellant and insulation, a burn-around would occur producing a major increase in burning surface and overpressuring of the motor.

Compounding a liner is complicated. Its composition is generally related to the composition of the propellant. It has the same binder, crosslinking agent, etc. The major differences between liner and propellant are that the liner does not contain an oxidizer (ammonium perchlorate), aluminum or nitroamino explosive compounds. The liner is applied using a "sling" lining apparatus that applies the liner through centrifugal force from a spinning spray head. A desired viscosity and certain flow properties are required of the liner. These properties are achieved through the use of inert fillers having high specific surfaces, such as a carbon black, titanium dioxide, silicon dioxide, etc.

The description of a state-of-the-art liner process which has been used in the fabrication of the Pershing II reveals the complexities of a typical liner process. Installation of the Pershing liner consists of the following, and requires approximately 40 hours to complete the following step of this state-of-the-art process:

(a) The surface of the internal insulator is degreased;
(b) The insulator's surface is buffed, and again degreased;
(c) A primer coat is sprayed onto the buffed insulator's surface;
(d) A barrier coat is applied;
(e) The liner is sprayed onto the barrier coat;
(f) The liner is allowed to undergo polymerization to the B-stage; and,
(g) The propellant is cast onto the liner.

It is recognized that the cost to complete the above process steps is significant, and simplification or elimination of the process steps would offer additional advantages.

The elimination of the need for a conventional-type liner provides a major cost advantage in addition to eliminating severe limitations that the conventional liners have shown to possess. These limitations are discussed below in the following statements relative to the compositions and thickness of the liners:

(a) The compositions of conventional liners have been such that they undergo a reduction in peel strength as the cure process progressed with aging.
(b) Unnecessarily thick liners have been necessary because the thicker the liner, the better the insulator-to-liner bond has been.

The peel strength values of most propellants generally undergo a major drop as the liner cure progresses from the minimum value to fully cured. This loss of peel strength with the advancing liner cure is related to the decreasing availability of curing agent to react and form the chemical bond because the curing agent migrates out of the propellant.

The goal is to achieve a propellant/liner bond strength that (when tested to the ultimate) where the failure will occur in the propellant rather than at the bond interface. As a result, the liner is formulated to have a higher tensile strength than the propellant, and similarly the interface is designed so that its strength is also greater than the propellant strength. Thus, the weak link in the system becomes the tensile or cohesive strength of the propellant and failure occurs in the propellant.

Applicant's method of U.S. Pat. No. 5,085,725 not only shortened the processing time for a current liner process of about 39 hours duration (for a Pershing II type missile to about 2 hours), but it also eliminated the need for a liner since the method comprised chemical bonding an isocyanate curable solid propellant composition to the outer surface of the internal insulation of an interceptor solid rocket motor. Specially, the trimer of 1,6-hexanediisocyanate was applied to the internal insulation outer surface and isocyanate curable propellant was placed on the trimer to form a chemical bond between the propellant composition and the internal insulation thereby eliminating the need for a liner between the internal insulation and the propellant composition.

An object of this invention is to provide a method of providing a very strong mechanical interlock between the insulation in a composite interceptor motor and the propellant, and, at the same time, eliminating the need for a liner whose function is to adhesively bond the propellant to the insulation.

A further object of this invention is a method which provides for pre-bonding or pre-vulcanization of a fibrous cloth mat to the insulation prior to motor manufacture.

Still a further object of this invention is to provide a method wherein propellant is cast against the fibrous cloth directly to form a mechanical bond which is reinforced by the fibers of the cloth.

SUMMARY OF THE INVENTION

The method, in accordance with this invention, provides a very strong mechanical interlock between the insulator in a composite interceptor motor and the propellant, and, at the same time, eliminates the need for a liner. The method comprises pre-bonding or pre-vulcanization of a fibrous cloth mat to the insulator prior to motor manufacture. The cloth mat is bonded to or integrated with the inner surface of the insulator. Propellant is then cast against the cloth directly to form a mechanical bond which markedly improves the interfacial peel bond strength between the propellant and the insulator.

The process for applying the cloth mat onto the interior surface of the insulator involves the use of a mandrel which matches the internal contour of the motor. The cloth is laid-up on the mandrel, and then the insulation is laid-up on the cloth. The insulation-covered mandrel is then transferred to an autoclave, and cured at 300° F. for 20-30 minutes at a pressure of 100-150 psi. The insulator is then inserted into the motor.

The most generally-used state-of-the-art insulator is composed of an ethylene-propylene-diene monomer (EPDM), filled with Aramid Kevlar 29 pulp, silica, etc., as depicted in Table I, and cured by reaction with sulfur. A baseline propellant composition is depicted in Table II. A baseline liner composition is depicted in Table III. These compositions are employed in comparisons of adhesion bond strengths of liner and fabric (cloth) coating on the insulator as depicted in Table IV. Effect of fabric-faced insulator on propellant-to-insulator bonding are depicted in Table V.

DESCRIPTION OF THE PREFERRED EMBODIMENT(S)

The method provides a very strong mechanical interlock between the insulator in a composite interceptor motor and the propellant, and, at the same time, eliminates the need for a liner. A fibrous cloth mat is first pre-bonded or pre-vulcanized to the insulator prior to motor manufacture. After the fibrous cloth mat is bonded to or integrated with the inner surface of the insulator, the integral unit is adhesively secured to the motor case on the insulator side. The propellant composition is then cast against the cloth mat directly to form a mechanical bond which markedly improves the interfacial peel bond strength between the propellant and the insulator.

Figure 1:
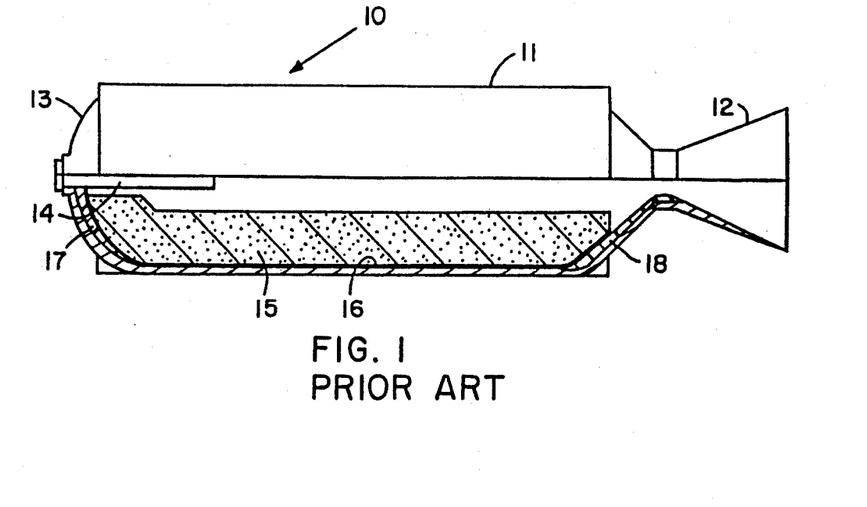
FIG. 1 depicts a cross-section of a simple missile motor.

In further reference to the Figures of the Drawings, FIG. 1 depicts a prior art rocket motor 10 in cross-sectional view to illustrate the location of the components of simple missile motor having a rocket motor case 11 with a rocket nozzle 12 affixed at the aft end. At the head-end 13, also referred to as dome closure end of the rocket motor case, is shown the head-end insulation 17, and at aft-end is shown the aft-end insulation 18. An igniter 14 is shown positioned through the dome for igniting propellant 15 which is positioned next to liner 16 inside rocket motor case 11.

Figure 2:
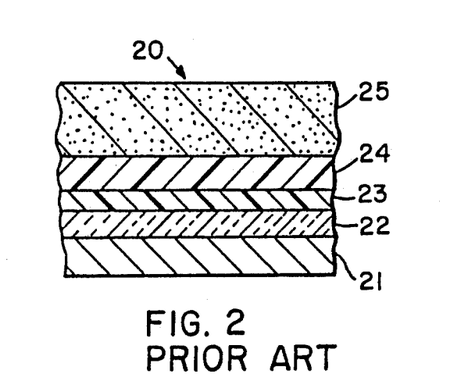
FIG. 2 shows a (Prior Art) state-of-the-art lay-up of the components of internal missile motor bond system.

FIG. 2 depicts the state-of-the-art (prior art) lay-up of the components 20 of an internal missile motor bond system wherein rocket motor case 21 has insulation 22 installed generally by hand lay-up and curing to the rocket motor case 21. Between insulation 22 and liner 24 is an adhesive 23 for securing liner 24 securely to insulation. Alternately, prior cured insulation can be installed with an adhesive composition applied to the rocket motor case. Propellant 25 is generally cast next to the liner and cured in place.

Figure 3:
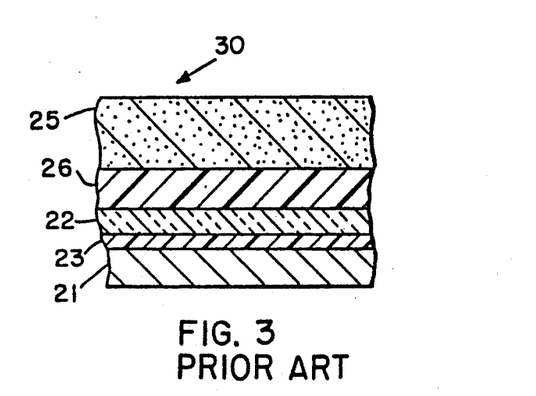
FIG. 3 (Prior Art) shows a lay-up of the components of an internal missile motor bond system depicting the polyisocyanate bonding agent between the propellant and insulation.

FIG. 3 depicts (another prior art) lay-up of the components 30 of an internal missile bond system wherein like numerals for similar components are employed as shown in FIG. 2 but wherein the polyisocyanate bonding agent 26 of applicant's prior invention is employed between the propellant 25 and insulation 22 which is secured to rocket motor case with an adhesive 23.

Figure 4:
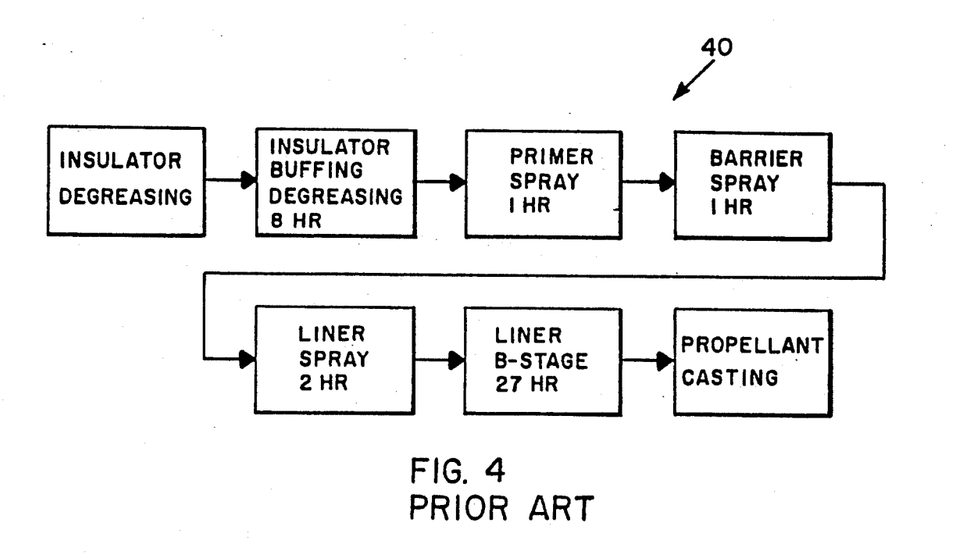
FIG. 4 shows a (Prior Art) current liner process of about 39 hours duration for a Pershing II type missile.

FIG. 4 depicts a (prior art) current liner process 40 which takes about 39 hours to complete.

Figure 5:
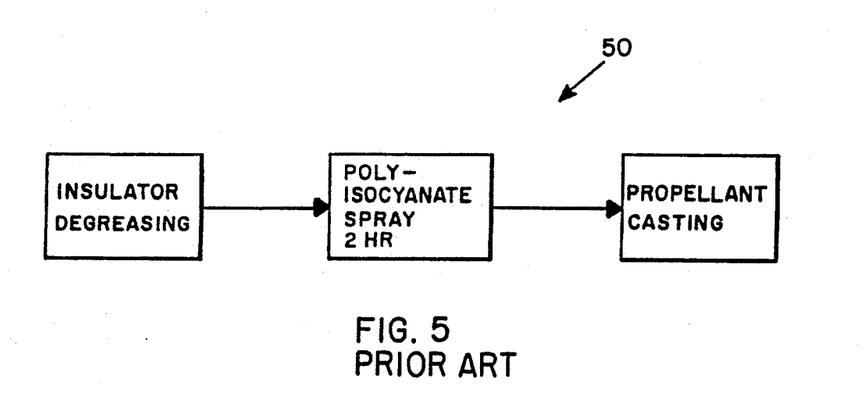
FIG. 5 (Prior Art) shows a polyisocyanate process of about 2 hours duration for a Pershing II type missile.

FIG. 5 depicts the polyisocyanate process 50 of applicant's prior invention which takes about 2 hours to complete the chemical bonding illustrated in FIG. 3.

Figure 6A:
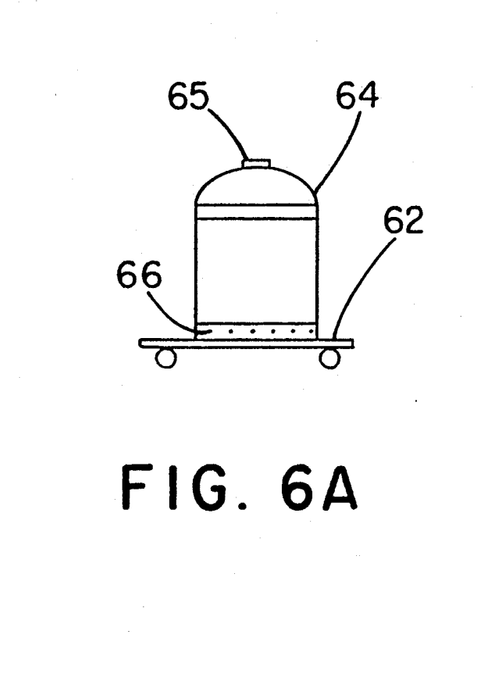
FIGS. 6A, 6B, and 6C depict the invention process for laying-up cloth mat onto the interior surface of the insulator.
Figure 6B:
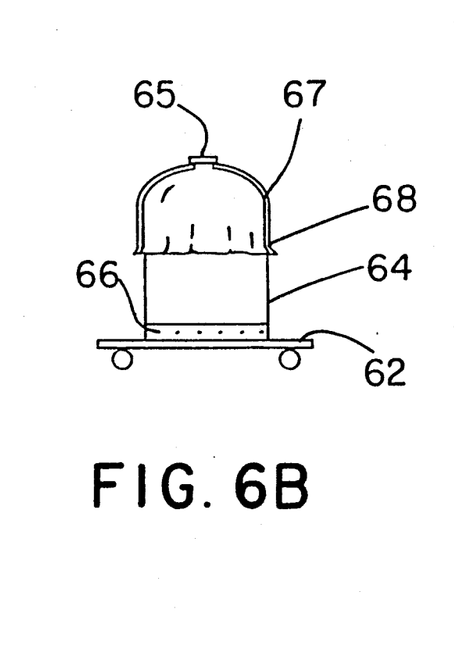
Figure 6C:
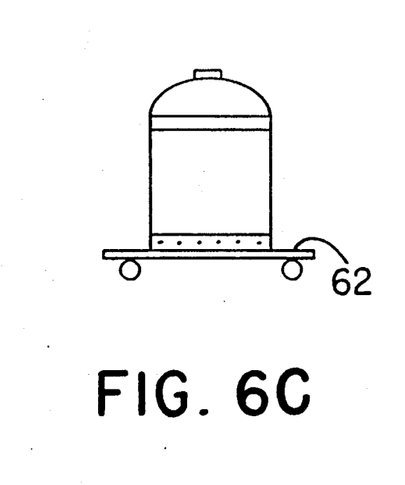

FIGS. 6A, 6B, and 6C depict process views with associated hardware and fixtures for laying-up cloth mat onto the interior surface of the insulator in accordance with the invention. The associated hardware and fixtures of 6A comprise an autoclave/lay-up cart 62 for supporting a mandrel shell 64 with boss 65. The mandrel shell 64 is provided with a clean, release liner with bleeder 66 (partially shown). The release agent including a perforated bleeder permits excess resins to be removed from the insulation and to permit easy release of mandrel after cure from lay-up materials.

In FIG. 6A, the mandrel shell 64 with clean, release liner with bleeder is shown ready for receiving lay-up rubber as further illustrated by FIG. 6B. In FIG. 6B, a boss 65 is shown at top of mandrel shell with cloth mat 67 with one side thereof next to the mandrel shell outer surface and with the other side thereof interfacing with insulator material 68. In FIG. 6C, the process for laying-up cloth mat onto the interior surface of the insulator is completed through the process steps of vacuum bag and autoclave curing and grinding contour to proper shape. This results in a consolidated insulator vulcanized to a cloth mat. The insulator with interior fabric mat is then ready for insertion and adhesively securing to a rocket motor case wherein a solid propellant composition is subsequently cast onto the cloth mat surface to which the propellant composition forms a mechanical bond with a markedly improved interfacial peel bond strength between the propellant and the insulator as shown by test data.

A preferred insulator composition which is composed of an ethylene-propylene-diene monomer (EPDM), filled with Aramid Kevlar 29 pulp, silica, etc. is shown in Table I below.

TABLE I

| INSULATOR COMPOSITION* | |
|---|---|
| INGREDIENT | COMPOSITION (PARTS PER HUNDRED PARTS PER RUBBER) |
| Ethylene-propylene-diene monomer (EPDM) | 100 |
| Kevlar 29 pulp** | 10 |
| Silica | 10 |
| Antimony oxide | 20 |
| Dechlorane plus*** | 40 |
| Butarez NF**** | 10 |
| Sulfur | 7.5 |

*Vulcanization Cycle = 300° F./100-150 PSI/20-30 min.
**Aramid (generic name for aromatic polyamide fiber)
***hexachlorocyclopentadiene
****non-functional polybutadiene A baseline propellant composition is depicted below in Table II. This composition is cast onto cloth mat which has previously been vulcanized (cured) to insulator composition shown in Table I.

TABLE II

BASELINE PROPELLANT COMPOSITION

| INGREDIENT | PERCENT |
|---|---|
| Hydroxyl-terminated polybutadiene prepolymer | |
| Antioxidant* | |
| Tepanol** | 10*** |
| Octadecyl isocyanate | |
| Triphenylbismuthine | |
| Isophorone diisocyanate | |
| Aluminum (30 micrometer) | 18 |
| Ammonium perchlorate (200 micrometer) | |
| Ammonium perchlorate (16 micrometer) | 72 |

*2,2-Methylene-bis(4-methyl-6-t-butylphenol)
**Reaction product of tetraethylenepentamine + acrylonitrile + glycidol
***Weight percent includes additives listed which function as antioxidant, curing catalysts, and curing agents Table III below depicts a baseline liner composition which is employed for comparison with applicant's process employing fabric mat.

TABLE III

LINER COMPOSITION

| FORMULATION INGREDIENT | WT % |
|---|---|
| Hydroxyl-terminated polybutadiene Prepolymer (R-45M/AO-2246)* | 41.85 |
| Carbon black | 40.00 |
| Dimerized 9,12-OCTADECADIENE (DDI) Diisocyanate (DDI)** | 12.15 |
| Trimesoyl-1-(2-ethylaziridine) (HX-868) | 6.00 |

*2,2,-Methylene-bis[4-methyl-6-t-butylphenol]

The preferred cloth mat employed in this invention is 128 denier muslin which is a woven cotton cloth which is a lighter weight bed sheet fabric. The cotton fibers have projections which facilitates the forming of a secure bond with the insulator to which it is cured, and additionally, having fiber projections which form a very strong mechanical interlock with an uncured propellant which is cast and cured to the cloth side of the vulcanized insulator/cloth mat.

Table IV sets forth a comparison of adhesion bond strengths of liner and fabric coating on the insulator.

TABLE IV

COMPARISON OF ADHESION BOND STRENGTHS OF LINER AND FABRIC COATING ON THE INSULATOR

| SPECIMEN | PREPARATION | ADHESION BOND (PSI) (77° F.) |
|---|---|---|
| Liner-insulator | None | 105 |
| Fabric-insulator | None | 135 |
| Liner-insulator | Sanded Degreased | 107 |
| Fabric-insulator | Sanded Degreased | 142 |

Figure 8:
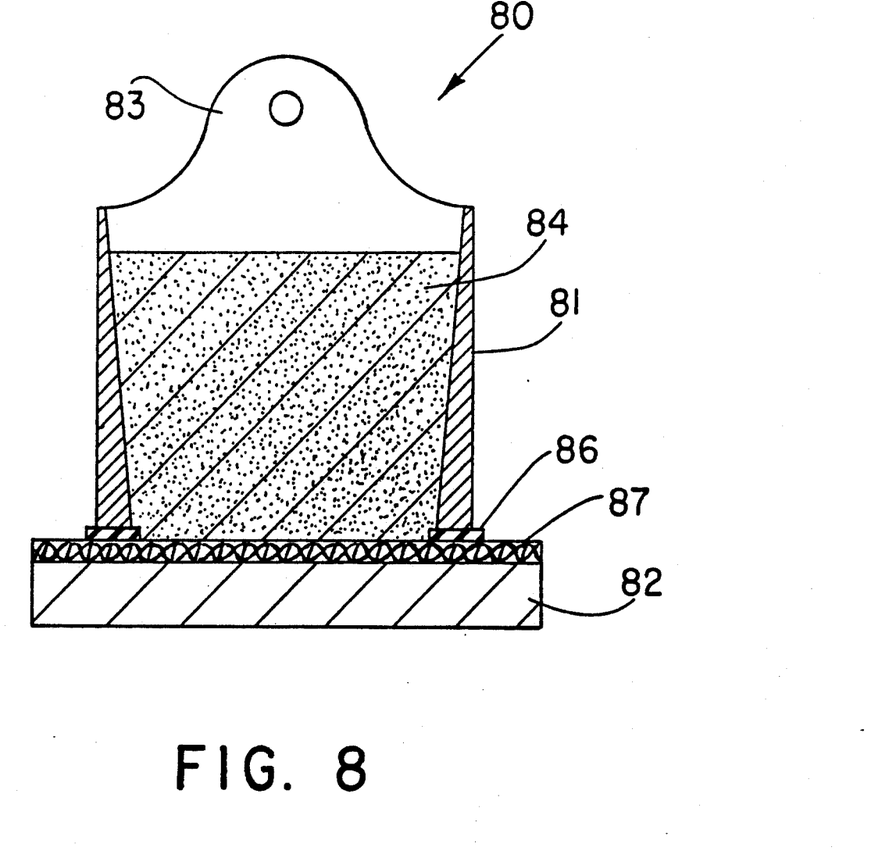
FIG. 8 depicts and adhesion bond test device.

In further reference to FIG. 8, the adhesion bond test device 80 comprises an aluminum adhesion cup 81, a base plate of steel 82, and an upper portion of cup 83 for applying a pulling force to determine adhesion bond strength between propellant 84 and liner/cloth 87. A gasket 86 supports lower rim of cup containing propellant which is secured to liner/cloth 87.

Table V depicts effect of fabric-faced insulator on propellant-to-insulator bonding for degreased surface of insulator and non-degreased surface of insulator as compared with insulator without fabric mat lining. All values of penetrometer, tensile strength, shear composite adhesion, and 90° peel strength are improved for cloth mat. Discussions of types of bond specimens and the methods used in preparation of samples for testing are presented below.

TABLE V

EFFECT OF FABRIC-FACED INSULATOR ON PROPELLANT-TO-INSULATOR BONDING

| IINSULATOR | INSULATOR SURFACE PREPARATION | PENETROMETER READING | TENSILE ADHESION STRENGTH (@ 2 INCHES PER MINUTE) | SHEAR COMPOSITE ADHESION STRENGTH (@ 2 INCHES PER MINUTE) | 90° PEEL STRENGTH (@ 5 INCHES PER MINUTE) |
|---|---|---|---|---|---|
| Ethylenepropylene-diene monomer/ Sulfurcross-linked, Aramid-filled | Degreased, Buffed, Degreased | 0.96 | 103 | 79 | 3.8 |
| Ethylenepropylene-diene monomer/ Sulfurcross-linked, Aramid-filled Fabric-lined | Degreased | 0.98 | 118 | 89 | 5.1 |
| Ethylenepropylene-diene monomer/ Sulfurcross-linked, Aramid-filled Fabric-lined | None | 0.98 | 119 | 87 | 4.5 |

Figure 7:
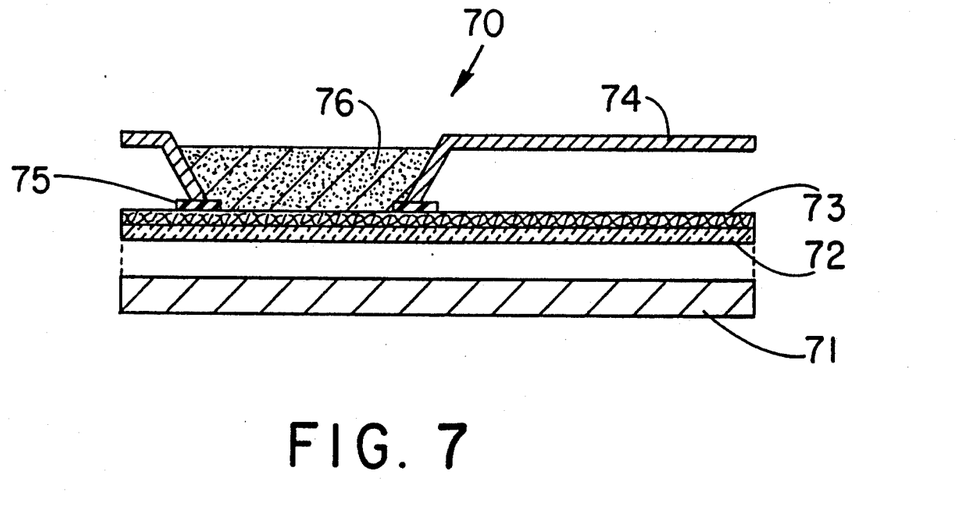
FIG. 7 depicts a propellant-to-liner peel test device.

With further reference to FIG. 7, a propellant-to-liner peel test device 70 comprises a steel backup plate 71 for supporting a shim stock (or flexible insulation tab) 72, a liner/cloth 73 secured to element 72, an aluminum peel mold 74, gaskets 75 are shown positioned between the aluminum peel mold and the liner/cloth, and propellant 76 is contained within the aluminum peel mold and in contact with liner/cloth 73. This test device is employed for peel strength testing at 5 inches per minute for liner/propellant and cloth/propellant interfaces.

Figure 9:
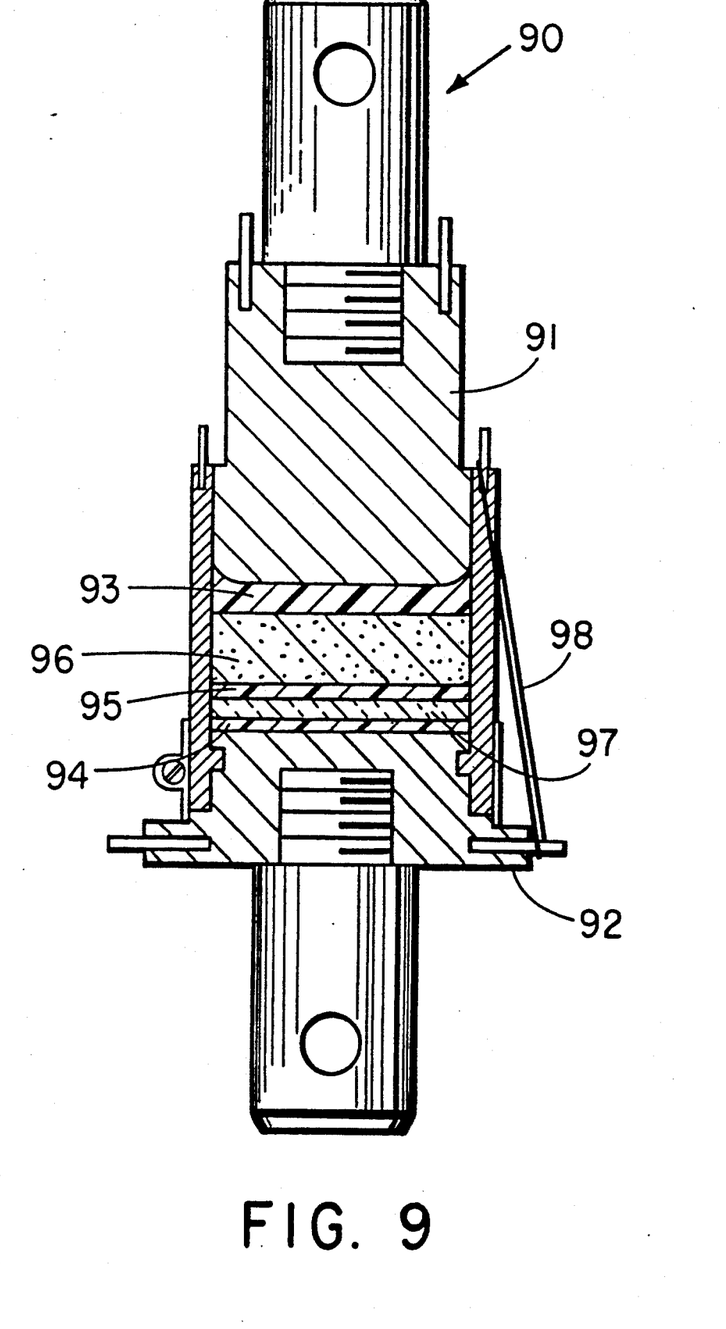
FIG. 9 depicts a composite structure for testing propellant-liner insulation-insulation bond strengths.

There are three types of bond specimens which are generally used to determine liner-to-insulator bond strength. These are referred to as peel, tensile adhesion and composite adhesion. FIG. 7 shows a sketch of the liner peel device, and FIG. 8 illustrates an adhesion bond test device elements as described previously. The peel specimen is tested at a 90° angle by removing the steel backup plate, and gradually bending the shim or insulation tab until it reaches 90°. The specimen is mounted in a holder with a roller track which moves as the specimen is tested in order to maintain a 90° angle. The tensile adhesion specimen is tested at 180°. FIG. 9 shows a sketch for the preparation of a composite adhesion specimen. FIG. 9 depicts a test fixture device 90 for the assessment of complete internal missile motor bond system. This test fixture device comprises an upper test fixture member (metal) 91 and a lower test fixture member (metal) 92. Each test fixture member has outer opposing surfaces to which an adhesive 93 and 94 is applied to the upper and lower test fixture member respectively. Propellant 96 is secured to adhesive 93 and a liner 95, which interfaces between the propellant 96 and insulation 97 which is secured to lower test member 92. The test fixture device 90 of FIG. 9 is used to compare test specimens under constant load. The data for this comparison is set forth hereinabove in Table V. This specimen is used to evaluate all of the motor materials and interfaces in a single test. By testing either dynamic or static loads, the weakest link in the system can be determined through the use of this test device.

The method used in the preparation of composite bond specimen is depicted in FIG. 8. The test bond specimen consists of layers of propellant-liner-insulator bonded to each other, and adhesively bonded to the faces of the tensile test device. A similar specimen consisted of propellant-fabric-insulation so that comparative testing could be done. Surface preparation (degreasing, buffing) was also carried out to determine whether these were beneficial. The results are presented in Table IV, along with penetrometer measurements in Table V. A significant improvement is tensile and shear was observed with the cloth-lined insulation. Insulation surface preparation had little effect. The terms cloth and fabric can be used interchangeably.

The test device which was used for peel testing of propellant-to-liner-to-insulation in comparison to propellant-to-fabric-faced insulation is depicted in FIG. 7, and the results are contained in Table V.

Eliminating the liner from the composite system used in propulsion subsystem is very beneficial because it results in the elimination of a component which, as it undergoes curing, results in a reduction in peel and adhesion strength.

In conclusion, to ensure that the conventional liner is fully cured requires an unnecessary long cure time—a minimum of 100-120 hours at 145° F. In contrast, the peel strength of cloth-faced insulation remains unchanged from the moment of fabrication because it becomes integral with the insulation when the latter is vulcanized. This means a considerable shortening of the time for motor fabrication with the peel strength and adhesive strength remaining nearly constant.

I claim:

1. A method of providing a very strong mechanical interlock between the insulator in a composite interceptor rocket motor and the solid composite interceptor propellant composition to thereby obviate the need for a liner, said method comprising:

(i) providing a mandrel shell with a boss, said mandrel shell with a boss provided with a clean, release liner on the outer surface thereof, said release liner including a perforated bleeder to permit excess resin to be removed from insulator during curing process and to permit easy release of mandrel shell with a boss from lay-up materials placed on said release liner with perforated bleeder;

(ii) placing a cloth mat of a first lay-up material over said release liner with bleeder;

(iii) applying a second lay-up material comprising an uncured rubber insulator composition over said cloth mat, said uncured rubber insulator composition curable by a predetermined vulcanization cycle at high temperature and pressure;

(iv) subjecting said first and second lay-up materials, said mandrel shell with boss, and said release liner including perforated bleeder to a vacuum bag and autoclave curing environment to complete a vulcanization cycle at a predetermined temperature of about 300° F., predetermined pressure from about 100-150 psi, and for a predetermined curing time period from about 20 to about 30 minutes, said predetermined temperature, pressure, and curing time sufficient to achieve vulcanization to consolidate said first and said second lay-up materials to form vulcanized insulator cloth mat cured to a state of cure which enables said second lay-up material to be ground to fit contour and shape of said composite interceptor rocket motor into which said vulcanized insulator/cloth mat is to be inserted;

(v) removing from said vacuum bag and autoclave curing environment, said mandrel shell with a boss with said vulcanized insulator/cloth mat which is supported by said mandrel shell with a boss;

(vi) grinding said outer surface of said vulcanized insulator/cloth mat to said contour and shape of said composite interceptor rocket motor;

(vii) removing said ground vulcanized insulator/cloth mat from said release liner or said mandrel shell with a boss;

(viii) inserting said ground vulcanized insulator/cloth mat into an interceptor rocket motor case and adhesively securing the outer surface of said ground vulcanized insulator/cloth mat to the inside of said interceptor rocket motor case;

(ix) casting an uncured solid composite interceptor propellant composition onto the cloth mat side of said vulcanized insulator/cloth mat; and, (x) curing said solid composite interceptor propellant composition to said vulcanized/cloth mat to form a very strong mechanical interlock between said insulator in said composite interceptor rocket motor and said cured solid composite interceptor propellant composition.

2. The method of providing a very strong mechanical interlock between the insulator in a composite interceptor rocket motor and the solid composite interceptor propellant composition as defined in claim 1 wherein said first lay-up material placed over said release liner with bleeder is a cloth mat of 128 denier woven cotton cloth.

3. The method of providing a very strong mechanical interlock between the insulator in a composite interceptor rocket motor and the solid composite interceptor propellant composition as defined in claim 2 wherein said second lay-up material placed over said cloth mat is an uncured rubber insulator composition which comprises about 100 parts of ethylene-propylene-diene monomer; about 10 parts of aromatic polyamide pulp, about 10 parts silica; about 20 parts antimony oxide; about 40 parts of hexachlorocyclopentadiene; about 10 parts of non-functional polybutadiene; and, about 7.5 parts of sulfur.

4. The method of providing a very strong mechanical interlock between the insulator in a composite interceptor rocket motor and the solid composite interceptor propellant composition as defined in claim 3 wherein said uncured solid composite interceptor propellant composition is comprised of hydroxyl-terminate polybutadiene prepolymer of about 10 weight percent including an effective amount of additives which function as antioxidant, curing catalysts, and curing agents, said additives including 2,2'-methylene-bis(4-methyl-6-t-butyl phenol), reaction product of tetraethylenepentamine and acryonitrile and glycidol, octadecyl isocyanate, triphenylbismuthine, and isophorone diisocyanate; about 18 weight percent aluminum powder; and about 72 weight percent of a mixed oxidizer of ammonium perchlorate, said mixed oxidizer being an equal molar mixture of 200 micrometer and 16 micrometer ammonium perchlorate.

* * * * *